Inventor:
Roland M. Lichtenstein,
by Merton D. Moore
His Attorney.

United States Patent Office 2,903,591
Patented Sept. 8, 1959

2,903,591

RADIATION MEASURING INSTRUMENT

Roland M. Lichtenstein, Schenectady, N.Y., assignor to General Electric Company, a corporation of New York Application February 18, 1955, Serial No. 489,012

18 Claims. (Cl. 250—83.3)

The present invention relates to a measuring circuit for radiation detectors. More particularly, the invention relates to a novel circuit arrangement for measuring the electrical output signals of linear radiation sensing elements, such as ionization chambers, proportional counters, scintillation detectors, or the like.

Radiation sensing elements of the types mentioned above, when exposed to nuclear radiation, respond by way of single ionizing events. To give one example of a single ionizing event a single track of ions will be left when a single charged corpuscle traverses the gas in an ionization chamber. In response to a single ionizing event, a sensing element may be caused to furnish an electrical output pulse, as when the ions in the track are collected in an ionization chamber. In the following discussion the term "single ionizing event" will include the emission of a light pulse (scintillation) by a phosphor when a portion of the phosphor is traversed by a charged corpuscle, as well as the aforementioned track of ions.

In order to define what is meant by a linear radiation sensing element, let us suppose that a first sequence of single ionizing events occurs during some time interval and causes the sensing element to furnish an electrical output signal which, as a function of the time $t$, would be written $I_1(t)$. This signal could be either a voltage or a current. Now let us suppose that instead of the first sequence, a second sequence of single ionizing events occurs during the same time interval as the first sequence and causes the sensing element to furnish an electrical output signal which, as a function of the time $t$, would be written $I_2(t)$. Now let us suppose that both the first and second sequences occur together. Now if the resulting electrical output signal $I(t)$ of the radiation sensing element is the sum of $I_1(t)$ and $I_2(t)$, then the radiation sensing element is said to be a linear one. All of the above mentioned radiation sensing elements are linear in this sense.

The electrical circuitry associated with the linear radiation sensing elements processes the electrical output pulses in various ways, according to the use to be made of the instrument. Until now, these various ways have fallen into two classes:

Class 1.—Only the direct current component of the pulses is used. An example is the measurement of the current drawn by an ionization chamber. The magnitude of this current serves as a measure of the intensity of the radiation.

Class 2.—The electrical output pulses of the sensing element are processed individually, in that each one is made to actuate a counting device. The rate of occurrence of the pulses (the number of pulses per unit time) is then a measure of the intensity of the radiation. Often the counting device is preceded by a pulse-sorting device which accepts pulses of any desired range of pulse heights. It is then possible to distinguish between different types of radiation. For instance, in a boron-lined proportional counter, the pulses produced by neutrons are much higher than those produced by gamma rays. If the pulse-sorting device accepts only the large pulses, the counting device will register only the pulse produced by neutrons and will ignore those pulses produced by gamma rays.

Clearly the second of the two classes of methods mentioned above cannot be used when the pulses occur so rapidly that they can no longer be resolved. Under these circumstances, it has become necessary to resort to the first of the above mentioned classes of methods; however, this class of methods cannot easily distinguish between different types of radiation.

However, it should be understood that in class 1 type of operation one can distinguish between different types of radiation to some limited degree. This is best appreciated from an example such as the boron lined ionization chamber used for measuring the flux-density of slow neutrons. Let $r_\text{neutron}$ and $r_\text{gamma}$ denote the rate of occurrence of single ionizing events caused by, respectively, the neutrons and the gamma rays. Let $\bar{Q}_\text{neutron}$ and $\bar{Q}_\text{gamma}$ be the average charge collected per ionizing event, when this event is due to, respectively, a neutron and a gamma ray. The total direct current I drawn by the chamber is then given by $$I = r_\text{neutron}\bar{Q}_\text{neutron} + r_\text{gamma}\bar{Q}_\text{gamma}$$

Now the larger the ratio $$\frac{\bar{Q}_\text{neutron}}{\bar{Q}_\text{gamma}}$$

is, the better will the chamber emphasize the neutrons over the gamma rays. Indeed, when one designs such a chamber, one sees to it that $\bar{Q}_\text{neutron}$ is much larger than $\bar{Q}_\text{gamma}$. Expressed briefly, one sees to it that the neutrons appear to the chamber as "large-pulse radiation," whereas the gamma rays appear to the chamber as "small-pulse radiation."

In practice, this degree of emphasis, a measure of which is the ratio $$\frac{\bar{Q}_\text{neutron}}{\bar{Q}_\text{gamma}}$$

is not good enough. One then resorts to complicated "bucking-out" arrangements, employing, for example, two chambers, one with a boron lining and thus sensitive to neutrons, the other without a boron lining and thus insensitive to neutrons. The two chambers are made so as to have equal sensitivity to gamma rays, and one then measures the difference between the currents drawn by the two chambers. Because of its complexity and imperfections, this arrangement has not been entirely satisfactory.

It is therefore one object of the present invention to provide a new and improved measuring circuit for linear radiation sensing elements which considerably emphasizes one type of radiation over another type of radiation.

It is another object of this invention to provide a new and improved measuring circuit for linear radiation sensing elements which considerably emphasizes large-pulse radiation over small-pulse radiation not only at low radiation intensities where individual pulses can be resolved, but also at high radiation intensities.

In practicing the invention, the nuclear radiation to be measured is made to cause a linear radiation sensing element to produce an electrical signal and this electrical signal is applied to a suitable averaging circuit. This averaging circuit is such a circuit as will measure the average of at least one non-linear function of the output signal from the sensing element to emphasize that portion of this output which is due to one type of radiation over that due to another type of radiation regardless of the rates of occurrence of the radiation pulses.

Other objects, features, and many of the attendant advantages of the invention will be appreciated more readily as the same becomes better understood by reference to the following detailed description, when considered in connection with the accompanying drawings, wherein.

Figure 1:
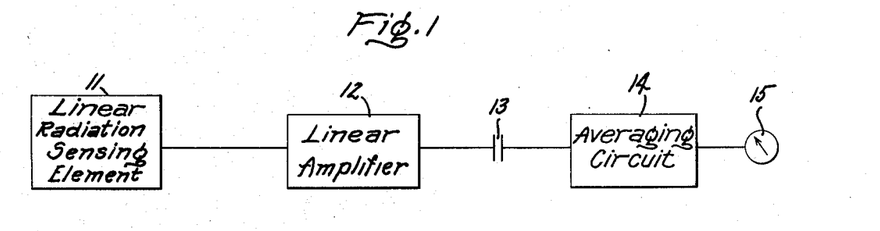
Fig. 1 is a block diagram showing the construction of a preferred form of radiation measuring instrument constructed in accordance with the invention.

The measuring circuit illustrated in Fig. 1 of the drawings includes a linear radiation sensing element 11 which preferably comprises an ionization chamber such as that illustrated and described in an article by Wilson, Beghian, Collie, Halban and Bishop entitled "High Pressure Ionization Chamber Counters and Their Use" appearing in the Review of Scientific Instruments magazine, volume 21, No. 8, August 1950, pages 699–705. While it is preferred that the linear radiation sensing element comprise an ionization chamber, the element also could comprise a proportional counter similar to one also described in the above-identified article, a boron-lined ion chamber responsive to neutrons, or a scintillation detector such as that illustrated in and described in United States patent application Serial No. 383,732—Patent No. 2,841,715—Radiation Detection Device—W. W. Schultz inventor—assigned to the same assignee as the present invention.

Figure 3:
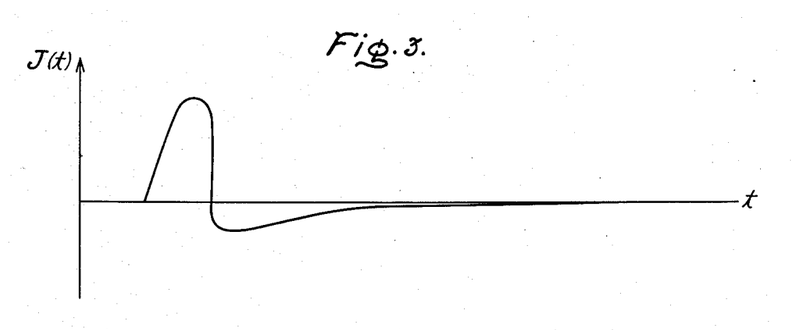
Fig. 3 is a graph of instantaneous current vs. time of a single electric signal pulse produced upon the occurrence of a single ionizing event in a radiation sensing element, as this pulse might appear at the output of the linear amplifier of Fig. 1 or 2.
Figure 4:
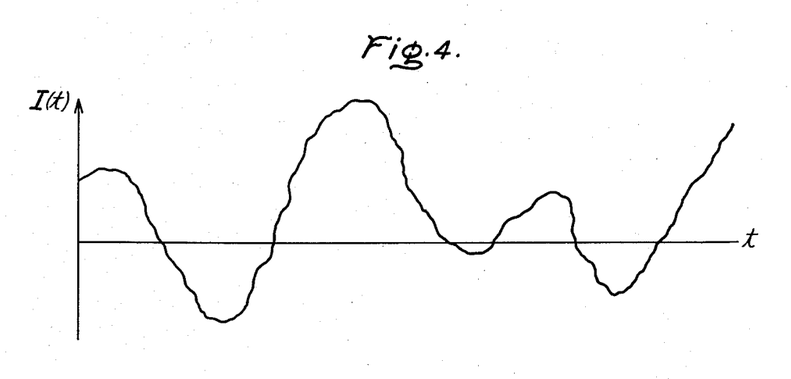
Fig. 4 is a graph of output current vs. time of the output electric signal produced by a radiation sensing element at higher radiation rates of occurrence, as this signal might appear at the output of the linear amplifier of Fig. 1 or 2.

In all of the above devices, the impingement of the nuclear radiation upon the radiation sensitive area of the devices produces an electrical signal whose magnitude is related to the type of radiation. In the case of the ionization chambers, the radiation ionizes gas contained within the ion chamber, and the ions thus produced cause a current pulse to flow between two electrodes contained within the chamber. For low rates of occurrence, this electric current comprises single pulses, for example, pulses of the type shown in Fig. 3, and for higher rates of occurrence, it assumes the characteristics of a fluctuating signal of the type shown in Fig. 4. Irrespective of its character, the signal may be supplied through output conductors to a suitable measuring circuit. The proportional counter and boron-lined ion chamber both work in substantially the same manner. In the case of the scintillation detector however, radiation first impinges upon a radiation sensitive phosphor which emits light flashes upon being bombarded by the nuclear radiation. A photomultiplier tube is exposed to these light flashes, and operates to develop an output electric signal pulse representative of the character of the original radiation.

The output electric signals from linear radiation sensing element 11 are fed to an everaging circuit 14. If these signals are not strong enough to actuate circuit 14, a linear amplifier 12 may be interposed, as shown. Amplifier 12 may be any suitable linear amplifier such as those described on page 106 of the textbook entitled "Electronics"—Elmore and Sands, authors—that comprises a part of the National Nuclear Energy Series published by the McGraw-Hill Publishing Co., 1949. The linear amplifier 12, if used, still is considered to form with element 11 a single linear radiation sensing element. The output terminals of amplifier 12 may be connected to the averaging circuit in such a way that any existing direct current component is suppressed, e.g. through a coupling capacitor 13. As will be explained later, capacitor 13 is not essential to the operation of the invention, but may serve a convenient purpose.

Averaging circuit 14 has a suitable indicating instrument 15 forming a part thereof. A square law detecting device such as a vacuum thermocouple may be used for averaging circuit 14, and it is connected in the manner described on pages 55 and 56 of a textbook entitled "Electrical Measurements" by Frank A. Laws (McGraw-Hill Co., Inc.) second edition, 1938. Other suitable square law detectors may be used in place of the thermocouple type of device. For example, the circuit arrangement shown and described on pages 599 and 600 of the textbook entitled "Theory and Applications of Electron Tubes" by Herbert J. Reich, McGraw-Hill Co., second edition, 1944, would be satisfactory. The indicating instrument 15, as noted above, is considered to comprise a part of the square law detector 14, and generally constitutes an ammeter of conventional construction. As will be more fully explained later, square law detectors would only be used for averaging circuit 14 when it is desired to obtain the average of the square of the output signal from the linear sensing element 11. The particular averaging circuit will be seen, therefore, to depend upon the function to be averaged.

The explanation of the operation of the measuring device shown in Fig. 1 will be understood more easily if the following simple theoretical basis is first established.

We would like to determine, generally, what the output of averaging circuits of any type would be when the output signal from a linear radiation sensing element is applied to the averaging circuits. To do this, let us assume that identical single ionizing events of some type 1 occur at random times with the constant average rate $r$. That is, during a time T, there occurs on the average $rT$ events. Let $u$ be an arbitrary number. This number is best thought of as being purely imaginary.

As an aid for our determinations as to the outputs from averaging circuits, we shall first establish an expression for the expectation value of $e^{uv(t)}$, where $v(t)$ is the output signal of a linear radiation sensing element as a function of the time $t$, and $e$ is the Naperian logarithm base. The expectation value or "ensemble average" of a quantity is the average of that quantity taken over a large number of identical experiments, where the numbers to be averaged are all recorded at the same time $t$. If the rate $r$ is constant, as we have assumed, then the ensemble average is independent of the time and is also equal to the time average of the quantity in question taken over a single experiment of long duration.

The formula that we want to establish is $$<e^{uv(t)}> = \exp\left\{r \int_{\tau=0}^{\infty} (e^{ug(\tau)} - 1) d\tau\right\} \quad (1)$$

where $\exp(X)$ is the exponential function of X, that is $e^x$, and $g(t)$ is the output signal as a function of time when just one event occurs at the time $t=0$. We derive it in the following manner. The single ionizing events are due to, say, radiations from some radioactive source. Let us split up the source into a large number M of identical sub-sources. Let $v_m(t)$ be the output voltage due to sub-source $m$. Then $$v(t) = \sum_{m=1}^{M} v_m(t)$$

$$e^{uv(t)} = \exp\left\{\sum_{m=1}^{M} uv_m(t)\right\} = \prod_{m=1}^{M} e^{uv_m(t)}$$

$$<e^{uv(t)}> = <\prod_{m=1}^{M} e^{uv_m(t)}>$$

But, since there is no correlation between the sources, the average of the product $$\prod_{m=1}^{M} e^{uv_m(t)}$$

is equal to the product of the averages. Thus $$<e^{uv(t)}> = \prod_{m=1}^{M} <e^{uv_m(t)}>$$

And since all the sub-sources are alike, $$\prod_{m=1}^{M} <e^{uv_m(t)}> = (<e^{uv_1(t)}>)^M$$

Thus $$<e^{uv(t)}> = (<e^{uv_1(t)}>)^M \quad (2)$$

Now we evaluate $<e^{uv_1(t)}>$. Assume that the pulses have a finite duration $T_1$, that is $g(t)=0$ for $t>T_1$. True enough, the pulses usually have a long exponential tail, and thus are infinitely long. But for all practical purposes a time $T_1$ can always be defined such that $g(t)$ is essentially zero for $t>T_1$. Consider now the expression $e^{uv_1(t)}-1$. It is zero, unless a pulse occurred during the interval $(t-T_1) \ldots t$. Since the rate of pulses from a sub-source is $$\frac{r}{M}$$

the probability that a pulse occurred in this interval is $$\frac{r}{M}T_1$$

(The probability that several pulses occur is vanishingly small, if M is chosen sufficiently large.) The pulse may begin at any time between $t-T_1$ and $t$. Thus, for the expectation value of $e^{uv_1(t)}-1$, we get $<e^{uv_1(t)}-1>$ =probability that a pulse has occurred times the average of $(e^{uv_1(t)}-1)$, provided that a pulse has occurred; or $$<e^{uv_1(t)}-1> = \frac{r}{M}T_1 \cdot \frac{1}{T_1}\int_{\tau=0}^{T_1}(e^{ug(\tau)}-1)d\tau$$

$$= \frac{r}{M}\int_{\tau=0}^{T_1}(e^{ug(\tau)}-1)d\tau$$

We may now move the upper limit of the integral to infinity, since for $\tau>T_1$ the integrand is zero. Thus, $$<e^{uv_1(t)}-1> = \frac{r}{M}\int_{\tau=0}^{\infty}(e^{ug(\tau)}-1)d\tau$$

And $$<e^{uv_1(t)}> = 1 + \frac{r}{M}\int_{\tau=0}^{\infty}(e^{ug(\tau)}-1)d\tau \quad (3)$$

Combining (2) and (3) we get $$<e^{uv(t)}> = \left(1 + \frac{r}{M}\int_{\tau=0}^{\infty}(e^{ug(\tau)}-1)d\tau\right)^M$$

We now let M approach infinity. The right hand side then approaches $$\exp\left\{r\int_{\tau=0}^{\infty}(e^{ug(\tau)}-1)d\tau\right\}$$

Thus finally, $$<e^{uv(t)}> = \exp\left\{r\int_{\tau=0}^{\infty}(e^{ug(\tau)}-1)d\tau\right\}$$

which is the relation 1 that we wanted to prove. $<e^{uv(t)}>$ is independent of the time $t$, since the right hand side of the last equation does not contain $t$.

Now let also single ionizing events of another type 2 take place with the rate of occurrence R. In what follows, R, V(t) and G(t) are related to events of type 2 just as $r$, $v(t)$ and $g(t)$ are related to events of type 1. Furthermore, let W(t) be the output signal when both types of events occur together. For a linear radiation sensing element. $W(t)=v(t)+V(t)$.

We then have $$<e^{uW(t)}> = <e^{v(t)+V(t)}> = <e^{v(t)} \cdot e^{V(t)}>.$$

But if there is no correlation between the two types of events, the average $<e^{v(t)} \cdot e^{V(t)}>$ of the product $e^{v(t)} \cdot e^{V(t)}$ is equal to the product $<e^{v(t)}><e^{V(t)}>$ of the averages. Thus from (1)

$$<e^{uW(t)}>$$

$$= \exp\left\{r\int_{\tau=0}^{\infty}(e^{ug(\tau)}-1)d\tau\right\} \cdot \left\{R\int_{\tau=0}^{\infty}(e^{uG(\tau)}-1)d\tau\right\}$$

or $$<e^{uW(t)}>$$

$$= \exp\left\{r\int_{\tau=0}^{\infty}(e^{ug(\tau)}-1)d\tau + R\int_{\tau=0}^{\infty}(e^{uG(\tau)}-1)d\tau\right\} \quad (4)$$

The generalization of (4) for N types of single ionizing events of types 1, 2, ... A ... N would be $$<e^{uW(t)}> = \exp\left\{\sum_{A=1}^{N} r_A \int_{\tau=0}^{\infty}(e^{uf_A(\tau)}-1)d\tau\right\} \quad (5)$$

where $r_A$ and $f_A(\tau)$ are related to events of type A just as $r$ and $g(t)$ are related to events of type 1.

We now take the logarithm of (5), $$\log <e^{uW(t)}> = \sum_{A=1}^{N} r_A \int_{\tau=0}^{\infty}(e^{uf_A(\tau)}-1)d\tau$$

Then we differentiate with respect to $u$. The derivative of the left hand side is $$\frac{1}{<e^{uW(t)}>} \frac{\partial}{\partial u}<e^{uW(t)}>$$

But differentiation and the taking of an ensemble average are interchangeable operations. Thus the derivative of the left hand side becomes $$\frac{1}{<e^{uW(t)}>} <\frac{\partial}{\partial u}e^{uW(t)}> = \frac{<W(t) e^{uW(t)}>}{<e^{uW(t)}>}$$

and the whole equation becomes (now we omit the $t$, since we have seen that the expressions above are independent of time for constant rates of occurrence)

$$\frac{<We^{uW}>}{<e^{uW}>} = \sum_{A=1}^{N} r_A \int_{\tau=0}^{\infty} f_A(\tau) e^{uf_A(\tau)} d\tau$$

or $$<We^{uW}> = <e^{uW}> \sum_{A=1}^{N} r_A \int_{\tau=0}^{\infty} f_A(\tau) e^{uf_A(\tau)} d\tau \quad (6)$$

Now we differentiate (6) $n$ times with respect to $u$, again making use of the fact that differentiation and the taking of an ensemble average are interchangeable operations:

$$<W^{n+1} e^{uW}>$$

$$= \sum_{\alpha=0}^{n} \frac{n!}{\alpha!(n-\alpha)!} \frac{\partial^{\alpha}}{\partial u^{\alpha}}\left(\sum_{A=1}^{N} r_A \int_{\tau=0}^{\infty} f_A(\tau) e^{uf_A(\tau)} d\tau\right)$$

$$\cdot \frac{\partial^{n-\alpha}}{\partial u^{n-\alpha}} <e^{uW}>$$

$$= \sum_{\alpha=0}^{N} \frac{n!}{\alpha!(n-\alpha)!} \sum_{A=1}^{N} r_A \int_{\tau=0}^{\infty} (f_A(\tau))^{\alpha+1} e^{uf_A(\tau)} d\tau$$

$$\cdot <W^{n-\alpha} e^{uW}> \quad (7)$$

Now set $u=0$ and use the abbreviation $$I\alpha = \sum_{A=0}^{N} r_A \int_{\tau=0}^{\infty} (f_A(\tau))^{\alpha+1} d\tau \quad (8)$$

We then get $$<W^{n+1}> = \sum_{\alpha=0}^{n} \frac{n!}{\alpha!(n-\alpha)!} I\alpha <W^{n-\alpha}> \quad (9)$$

$<W^{n+1}>$ is the output from an averaging circuit that takes the average of the $n+1$ power of the output signal from the linear radiation sensing element. Of course, a single physical embodiment of an averaging circuit only gives us a time average of this output, rather than the expectation value which would be an ensemble average; however, if the time average is taken over a sufficiently long period, it is equal to the ensemble average.

Let us now write (9) for successive values of $n$. Here we use $<W^0>=<1>=1$.

$$n=0 \mid <W>=I_0$$
$$n=1 \mid <W^2>=I_0<W>+I_1$$
$$n=2 \mid <W^3>=I_0<W^2>+2I_1<W>+I_2$$
$$n=3 \mid <W^4>=I_0<W^3>+3I_1<W^2>+3I_2<W>+I_3$$
$$n=4 \mid <W^5>=I_0<W^4>+4I_1<W^3>$$
$$+6I_2<W^2>+4I_3<W>+I_4$$

etc.
$$(10)$$

The system of equations (10) allows us to express the mean values $<W^n>$ in terms of the pulse shapes and the occurrence rates. For what follows later, it is instructive to solve (10) for $I_0, I_1, I_2 \ldots$. We then get $$I_0 = <W> \tag{11}$$
$$I_1 = <W^2> - <W>^2$$
$$I_2 = <W^3> - 3<W^2><W> + 2<W>^3$$
$$I_3 = <W^4> - 4<W^3><W> - 3<W^2>^2$$
$$+ 12<W^2><W>^2 - 6<W>^4$$
$$I_4 = <W^5> - 5<W^4><W> - 10<W^3><W^2>$$
$$+ 20<W^3><W>^2 + 30<W^2>^2<W>$$
$$- 60<W^2><W>^3 + 24<W>^5$$

etc.

The second equation of Equations 11 is effectively disclosed in an article appearing in the British publication "Journal of the Institution of Electrical Engineers," 1946, vol. 93, part III, pages 45 to 52, written by N. R. Campbell, and V. J. Francis. Equations 11, therefore, represent a generalization of the equation shown in this article, and they are not limited merely to square functions.

In order to find the practical consequences of the system of Equations 11 . . . let us make an additional assumption. The assumption is that the pulse shape, given by the function $f_A(\tau)$ is independent of the type A of the event, except for a scale factor which we shall denote by $Q_A$. Thus we may write $$f_A(\tau) = Q_A h(\tau) \tag{12}$$

where, now, $h(\tau)$ depends solely on the construction of the linear radiation sensing element. We have pointed out previously that a linear radiation sensing element may contain various linear shaping and amplifying circuits. If such circuits are included, $h(\tau)$ will depend also on their construction and not just on the construction of the sensing element proper. In ion chambers and proportional counters, $Q_A$ may be identified with the total charge of the positive ions produced in a single ionizing event of type A. In scintillation counters, $Q_A$ may be identified with the total amount of light emitted per scintillation of type A. The assumption expressed in (12) is fulfilled for ion chambers, proportional counters and scintillation counters, if certain subsidiary conditions, well known in the art, are met. (For instance, in ionization chambers and proportional counters, the pulse should be shaped so that its duration is long compared with the time needed for collecting the ions produced in a single ionizing event. Also, in proportional counters and scintillation counters statistical variations in the gain should be small enough so that they may be disregarded in what follows.)

With the abbreviation $$K_\alpha = \int_0^\infty (h(\tau))^{\alpha+1} d\tau \tag{13}$$

we have, from (8) and (12), $$I_\alpha = K_\alpha \sum_{A=1}^{N} r_A Q_A^{\alpha+1} \tag{14}$$

so that the system of Equation 11 now becomes $$K_0 \sum_{A=1}^{N} r_A Q_A = <W> \tag{15}$$

$$K_1 \sum_{A=1}^{N} r_A Q_A^2 = <W^2> - <W>^2$$

$$K_2 \sum_{A=1}^{N} r_A Q_A^3 = <W^3> - 3<W^2><W> + 2<W>^3$$

$$K_3 \sum_{A=1}^{N} r_A Q_A^4 = <W^4> - 4<W^3><W> - 3<W^2>^2$$
$$+ 12<W^2><W>^2 - 6<W>^4$$

$$K_4 \sum_{A=1}^{N} r_A Q_A^5 = <W^5> - 5<W^4><W>$$
$$- 10<W^3><W^2> + 20<W^3><W>^2$$
$$+ 30<W^2>^2<W> - 60<W^2><W>^3 + 24<W>^5$$

etc.

With averaging circuits we determine the right hand side of any one of the above equations. Let us call a number determined in this experimental fashion by the term "reading." Let us denote the reading corresponding to the $n$th equation of the system (15) by the symbol $L_n$. We then have $$L_n = K_{n-1} \sum_{A=1}^{N} r_A Q_A^n \tag{16}$$

To appreciate the importance of Equation 16 assume, in order to simplify matters, that we deal with just two types of ionizing events: Type "large," and type "small." Assume further that $$Q_{\text{large}} > Q_{\text{small}}$$

as the identifying subscripts indicate. Assume further that events of type "large" are due to one kind of radiation, hereafter called large-pulse radiation, and that events of type "small" are due to another kind of radiation, hereafter called small-pulse radiation. This somewhat idealized situation is an approximation to the real situation obtaining when, for example, a fission counter (an ionization chamber with a $U^{235}$ lining) is exposed to neutrons and gamma rays. In this example the neutrons constitute the large-pulse radiation, and the gamma rays constitute the small-pulse radiation. True enough, each kind of radiation will still give rise to many types of ionizing events; but the simplification of just two types of events will bring out the point we wish to make. Equation 16 then becomes $$L_n = K_{n-1} r_{\text{large}} Q^n_{\text{large}} + K_{n-1} r_{\text{small}} Q^n_{\text{small}} \tag{17}$$

or $$L_n = L_{n\ \text{large}} + L_{n\ \text{small}} \tag{18}$$

where $L_n$=reading obtained when both types of radiation occur together, $L_{n\ \text{large}} = K_{n-1} r_{\text{large}} Q^n_{\text{large}}$=reading obtained when only the large-pulse radiation occurs, and $L_{n\ \text{small}} = K_{n-1} r_{\text{small}} Q^n_{\text{small}}$=reading obtained when only the small-pulse radiation occurs.

Equation 18 tells us that the actual reading is the sum of the readings for each kind of radiation. Furthermore $$\frac{L_{n\ \text{large}}}{L_{n\ \text{small}}} = \frac{r_{\text{large}}}{r_{\text{small}}} \frac{Q^n_{\text{large}}}{Q^n_{\text{small}}} = \frac{r_{\text{large}}}{r_{\text{small}}} \frac{Q_{\text{large}}}{Q_{\text{small}}} \left(\frac{Q_{\text{large}}}{Q_{\text{small}}}\right)^{n-1}$$

or $$\frac{L_{n\ \text{large}}}{L_{n\ \text{small}}} = \frac{L_{1\ \text{large}}}{L_{1\ \text{small}}} \left(\frac{Q_{\text{large}}}{Q_{\text{small}}}\right)^{n-1} \tag{19}$$

Equation 19 tells us that, for readings corresponding to the $n$th equation, the contribution from the large-pulse radiation is emphasized over the contribution from the small-pulse radiation $$\left(\frac{Q_{\text{large}}}{Q_{\text{small}}}\right)^{n-1}$$

times better than for readings corresponding to the first equation, that is for readings obtained in the operation of class 1 mentioned at the beginning of the specification and currently employed. That one can increase the emphasis on the large-pulse radiation by a factor of $$\left(\frac{Q_{\text{large}}}{Q_{\text{small}}}\right)^{n-1}$$

when one uses readings corresponding to the $n$th Equation 16 with $n>1$, is the chief advantage of this invention.

Let us bring out this advantage once more, in different words. Suppose one wants to measure one kind of radiation (neutrons) over a background of another kind of radiation (gamma rays). One first selects a linear radiation sensing element (a fission counter) to which the first kind of radiation appears as large-pulse radiation and to which the second kind of radiation appears as small-pulse radiation. Then with a suitable averaging circuit one takes readings corresponding to the $n$th equation of the system (16). One selects $n$ as high as simplicity of equipment permits. (For $n=2$, simple equipment is available, and for $n=3$ simple equipment can be constructed. For larger values of $n$ the equipment would be more complex but still possible.) In the present invention, the emphasis on the large-pulse radiation is then $$\left(\frac{Q_{\text{large}}}{Q_{\text{small}}}\right)^{n-1}$$

times better than in currently used equipment. Therefore, some given intensity of large-pulse radiation can be recorded in the presence of a background of small-pulse radiation having an intensity which may well be $$\left(\frac{Q_{\text{large}}}{Q_{\text{small}}}\right)^{n-1}$$

times higher than that permissible with the use of currently used equipment. Furthermore, this advantage exists, independent of the rate of occurrence of the single ionizing events, in particular for rates of occurrence so high that individual pulses pile up, so that equipment of class 2, which processes the pulses individually, can no longer be used.

The right hand sides of the system (15), the readings, are seen to be combinations of averages; the only exception is the first of Equations 15 where just one average occurs. Great simplification can be achieved, if one sees to it that the direct current component is suppressed in the output signal of the linear radiation sensing element before it is fed to the averaging circuit. If the direct current component is not already suppressed in the linear circuits that may be associated with the sensing element, suppression may be achieved by means of the coupling capacitor 13 of Figs. 1 and 2. Then we must necessarily have $$\int_0^\infty f_A(\tau)d\tau=0$$

and also, from (12), $$\int_0^\infty h(\tau)d\tau=0$$

so that, from (13) and (14)

$$I_0=0,\ K_0=0$$

and from (11) or (15)

$$<W>=0 \tag{20}$$

Then the system (15) simplifies into $$K_1\sum_{A=1}^{N}r_AQ_A^2=<W^2> \tag{21}$$

$$K_2\sum_{A=1}^{N}r_AQ_A^3=<W^3>$$

$$K_3\sum_{A=1}^{N}r_AQ_A^4=<W^4>-3<W^2>^2$$

$$K_4\sum_{A=0}^{N}r_AQ_A^5=<W^5>-10<W^3><W^2>$$

etc.

(A similar simplification holds for (11).) The readings that one has to take are then simply $$L_2=<W^2> \tag{22}$$
$$L_3=<W^3>$$
$$L_4=<W^4>-3<W^2>^2$$
$$L_5=<W^5>-10<W^3><W^2>$$

etc.

In particular, just one averaging circuit, a square law detector such as a vacuum thermocouple, suffices for obtaining $L_2$. And just one averaging circuit, a cube law detector, suffices for obtaining $L_3$.

To demonstrate the validity of the invention, a paraffin moderated neutron source was acquired and a fission chamber was inserted into the source and used in conjunction with a conventional discriminator and counting rate meter. At the location of the fission chamber the neutron flux density was approximately 8400 neutrons per square centimeter per second averaged over the volume of the ionization chamber, and the counting rate due to neutrons was in the neighborhood of 3000 pulses/sec. Upon the ionization chamber being connected to a vacuum thermocouple having a galvanometer connected thereto through a 1000 ohm resistor, and the chamber being exposed to neutrons, the following table of readings was obtained:

I. Chamber exposed to neutrons

| D.C. volts across ion chamber: | Galvanometer reading |
|---|---|
| 0 | 3.5 |
| 67 | 48 |
| 112 | 50 |
| 157 | 51 |
| 225 | 52 |

From an examination of the values cited in this table, it can be seen that there is a very slight change in current reading for large changes of the direct current energizing voltage applied to the ionization chamber, once this voltage is sufficiently large. When the chamber was not exposed to the beam of neutrons, the following readings were obtained.

II. Chamber not exposed to neutrons

| D.C. voltage across chamber: | Galvanometer reading |
|---|---|
| 0 | 3.5 |
| 67 | 18.5 |
| 112 | 19 |
| 157 | 20 |
| 225 | 20 |

In the last set of readings, the galvanometer did not indicate zero since a certain amount of uranium in the ionization chamber used emitted alpha particles which gave rise to an output signal. Note, however, that the ratio of the neutron reading of the instrument to the alpha particle reading of the instrument was $$\frac{52-20}{20}=1.6 \tag{23}$$

This observation indicates clearly why it is preferable to utilize the output signal from the ionization chamber in the manner prescribed by the present invention rather than with a direct current type instrument of the class 1 type mentioned above. When analogous data were obtained by use of the conventional direct current type instrument, the following readings were obtained:

I. *Chamber exposed to neutrons*

D.C. voltage
across chamber:          Output current
  0 ______________________________ .12×10⁻⁸ amp.
  225 ____________________________ .80×10⁻⁸ amp.

II. *Chamber not exposed to neutrons*

D.C. voltage across chamber:    Output current
  0 ______________________________ .12×10⁻⁸
  225 ____________________________ .72×10⁻⁸

From a consideration of the last set of readings, it can be determined that the ratio of the neutron reading to the alpha particle reading when the ionization chamber was connected in a conventional manner was $$\frac{.80-.72}{172}=.11 \tag{24}$$

From a comparison of the two ratios, (23) and (24), it can be appreciated that if the chamber is connected in the manner prescribed in the present invention, the neutron reading will be emphasized over the alpha particle readings by a factor of $$\frac{1.6}{.11}=14$$

times better than the emphasis obtained if the ionization chamber output current is measured with a class 1 type of direct current instrument.

For the same reasons that neutrons were extremely well emphasized over alpha particles, they will also be much better emphasized over gamma and beta rays. Further, alpha particles will be emphasized over gamma and beta rays in the same fashion. This emphasis is much better than that obtained with gamma-ray-compensated ionization chambers of the best construction or with any other known single device at the higher rates of occurrence. Heretofore, it was possible to obtain comparable emphasis at the higher rates only by using at least two primary radiation detectors, one of which was designed to respond only to gamma or beta rays with its output connected in an out-of-phase fashion to the output of the other. By such construction, undesired output signals produced by the gamma and beta rays were cancelled out in what is known as a "bucking-out" arrangement. The complexity of such a scheme prevented its use in a number of applications, and the necessity of its use is obviated by the present invention.

It should be further noted that the types of radiation for which an ionization chamber, or equivalent linear radiation sensing element, can be used in cooperation with a conventional output counting circuit of class 2, and the radiation intensities wherein the chamber can be used with a measuring circuit designed in accordance with the present invention, overlap. Hence, it is possible to use one ionization chamber or any other kind of linear radiation sensing element of suitable construction with both types of output measuring circuits to cover any range of radiation rates of occurrence that one would desire to measure. One circuit arrangement of this type is disclosed in Fig. 2 of the drawings wherein a radiation sensing element 11 comprising any one of the primary detectors listed earlier in the specification, has its output connected through a linear amplifier 12 to the movable contact of a suitable selector switch 16. Selector switch 16 has one of its fixed contacts coupled through a coupling capacitor 13 to a square law detector 14 and an indicating instrument 15. Hence, when the movable contact of the switch is closed on this fixed contact, the circuit operates in a fashion identical to the circuit illustrated in Fig. 1.

Figure 2:
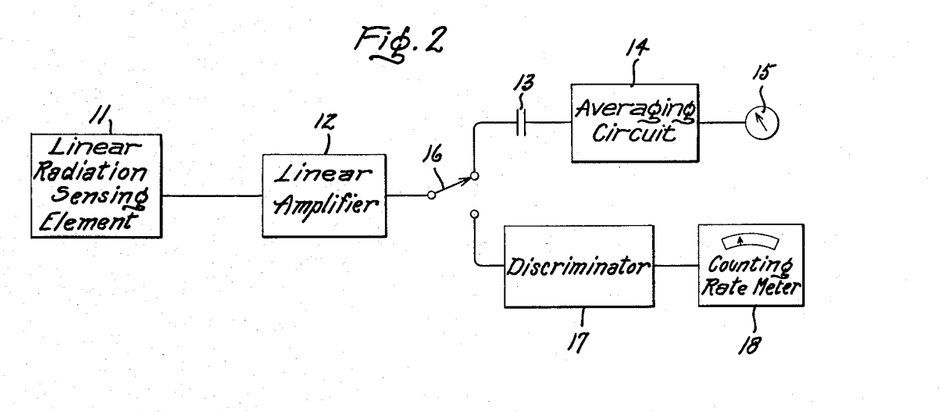
Fig. 2 is a block diagram of a radiation measuring instrument suitable for use over widely different ranges of radiation intensities, and which incorporates the novel features of the present invention.

Connected to the remaining fixed contact of the selector switch 16 is a pulse discriminating circuit 17 of the type described on page 100 of the Elmore and Sands text identified above. Connected to the output of the discriminator circuit 17 is a counting rate meter of the type described on page 249 of the same text. As the construction and operation of both the discriminating circuit and the counting rate meter are well known in the art, further description of these elements is believed unnecessary.

Upon the movable contact of the selector switch 16 being closed on its lower fixed contact, the circuit operates as a conventional counting circuit to provide an output count of the rate of occurrence of single ionizing events in the radiation sensing element 11. At higher radiation rates of occurrence, the movable contact of switch 16 is thrown to its upper fixed contact, and the meter 15 will measure the radiation in accordance with the invention, as outlined above. With an instrument of this type, it is possible to cover all possible ranges of radiation rates of occurrence that one would desire to measure.

Additionally, it is possible to obtain even greater benefits with the invention if an averaging circuit is used which is a third law detector, or for that matter, any averaging circuit operating on any law higher than one. If a third law detector is used, then large-pulse radiation is emphasized over small-pulse radiation by an additional factor of $$\left(\frac{Q_A}{Q_B}\right)^2$$

over the direct current type instrument of class 1, which is a considerable advantage, since $$\left(\frac{Q_A}{Q_B}\right)^2$$

is even larger than $$\frac{Q_A}{Q_B}$$

As the construction of such a system employing a third power detecting device is believed obvious from the preceding description, further details of the system are believed unnecessary.

It should be made clear at this point that averaging circuit 14 could comprise a square law detector, such as the vacuum thermocouple noted above, as well as any other type of square law detector. Another suitable square law detector will be found described in the February 1955 issue of Electronics, published by the McGraw-Hill Publishing Co., pages 160–163, in an article entitled, "Wide-Band Analog Function Analyzer" by J. A. Miller, A. S. Soltes, and R. E. Scott. This article discusses the principles of producing detectors by deflecting a flat sheet of electrons across a target electrode containing apertures. By varying the shapes of the apertures, a detector operating according to any desired law could be constructed. It should therefore be clear from the foregoing that many types of detectors such as cube law detectors, 4th law detectors, etc., could be used for averaging circuit 14.

It should also be emphasized that averaging circuit 14 could include therein a combination of detectors, and whenever this term is used in the specification and claims, it is intended that it should include such a combination. For example, when a fourth law detector is used, a square law detector must be used, as shown by the third equation of Equations 22, since the average of the output from the square law detector must be squared, tripled, and subtracted from the output of the fourth law detector.

It should also be understood that the present invention is not necessarily limited to the emphasis of large-pulse radiation over small-pulse radiation; since if it is desired to emphasize small-pulse radiation over large-pulse radiation, detectors operating at powers less than might perhaps serve the purpose and be used in averaging circuit 14. Moreover, although the simplest forms of detectors operate under laws which are whole integers, detectors are known to the art which also operate at fractional integers (for example, detectors that operate on the three-halves power could be constructed in accordance with the principles of the above-noted Miller article). Although the use of such detectors would greatly complicate the mathematics involved, it is conceivable that such detectors could be used to practice this invention, and their use should not be excluded from the teachings of this invention.

Furthermore, it is well known in the art that there are many ways of cancelling out the direct current, or first order functions, from the output of sensing element 11, other than by using capacitor 13. For example, a transformer could be so used, and would be the full equivalent of this capacitor. Other such elements will readily occur to those skilled in the art.

From the foregoing description, it can be appreciated that the present invention provides a new and improved measuring circuit for measuring the output of linear radiation sensing elements at pulse radiation frequencies that are so large as to make their measurement extremely difficult by presently known apparatus. Further, the present invention greatly emphasizes large-pulse radiation over small-pulse radiation at these high radiation frequencies.

Obviously, other modifications and variations of the invention are possible in light of the above teachings. It is, therefore, to be understood that changes may be made hereto which are within the full intended scope of the invention as defined by the appended claims.

What I claim as new and desire to secure by Letters Patent of the United States is:

1. A radiation measuring instrument for distinguishing between different types of radiation by emphasizing one over the other comprising, a linear radiation sensing element responsive to different types of radiation for producing an electrical output in response to the radiation, circuit means coupled to the output of said sensing element for distinguishing and emphasizing that portion of said electrical output due to one type of radiation including averaging circuit means for measuring the average of a non-linear function of said electrical output.

2. A radiation measuring instrument for distinguishing between different types of radiation by emphasizing one over the other comprising, a linear radiation sensing element responsive to different types of radiation for producing an electrical output in response to radiation, circuit means coupled to the output of said sensing element for distinguishing and emphasizing that portion of said electrical output due to one type of radiation including an averaging circuit for measuring the average of a non-linear function of said electrical output, and means coupled to said circuit for reducing to zero the average of the first power of said output signal.

3. A radiation measuring instrument comprising, a linear radiation sensing element for producing an output signal in response to the impingement of radiation pulses thereon, a first circuit coupled through switch means to the output of said sensing element for measuring the average of at least one non-linear function of said output signal regardless of the rates of occurrence of said radiation pulses, and a second circuit operatively coupled through said switch means to the output of said sensing element for measuring the rate of occurrence of said radiation pulses at lower rates of occurrence, said switch means selectively connecting either said first or said second circuit to the output of said sensing element.

4. A radiation measuring instrument comprising, a linear radiation sensing element for producing an output signal in response to the impingement of radiation pulses thereon, a first circuit coupled through switch means to the output of said sensing element for measuring the average of at least one non-linear function of said output signal regardless of the rates of occurrence of said radiation pulses, a second circuit operatively coupled through said switch means to the output of said sensing element for measuring the rate of occurrence of said radiation pulses at lower rates of occurrence, said switch means selectively connecting either said first or said second circuit to the output of said sensing element, and means coupled to said first circuit for reducing to zero the average of the first power of said output signal.

5. A radiation measuring instrument for distinguishing between different types of radiation by emphasizing one over the other comprising, a linear radiation sensing element responsive to different types of radiation for producing an electrical output in response to radiation, circuit means coupled to said sensing element for distinguishing and emphasizing that portion of said electrical output due to one type of radiation regardless of the rate of occurrence of the output producing radiation including means for measuring the average of the square of said electrical output.

6. A radiation measuring instrument for distinguishing between different types of radiation by emphasizing one over the other comprising, a linear radiation sensing element responsive to different types of radiation for producing an electrical output in response to the radiation, circuit means coupled to said sensing element for distinguishing and emphasizing that portion of said electrical output due to one type of radiation regardless of the rate of occurrence of the output producing radiation events including means for measuring the average of the cube of said electrical output.

7. A radiation measuring instrument for distinguishing between different types of radiation by emphasizing one over the other comprising, a linear radiation sensing element responsive to different types of radiation for producing an electrical output in response to the radiation, circuit means coupled to said sensing element for distinguishing and emphasizing that portion of said electrical output due to one type of radiation including means for measuring the average of the square of said electrical output regardless of the rate of occurrence of the output producing events, and means coupled to said circuit for reducing to zero the average of the first power of said electrical output.

8. A radiation measuring instrument for distinguishing between different types of radiation by emphasizing one over the other comprising, a linear radiation sensing element responsive to different types of radiation for producing an electrical output in response to radiation, circuit means coupled to said sensing element for distinguishing and emphasizing that portion of said electrical output due to one type of radiation including means for measuring the average of the cube of said electrical output regardless of the rate of occurrence of the output producing events, and means coupled to said circuit for reducing to zero the average of the first power of said electrical output.

9. A radiation measuring instrument comprising, a linear radiation sensing element for producing an output signal in response to the impingement of radiation pulses thereon, a first circuit operatively coupled through switch means to the output of said sensing element for measuring the average of at least one non-linear function of said output signal to emphasize the portion of said output due to large pulse radiation over that due to small pulse radiation regardless of the rates of occurrence of said pulses, and a second circuit operatively coupled through said switch means to the output of said sensing element for measuring the rate of occurrence of said radiation pulses at lower rates of occurrence, said switch means selectively connecting either said first or said second circuit to the output of said linear radiation sensing element.

10. A radiation measuring instrument comprising, a linear radiation sensing element for producing an output signal in response to the impingement of radiation pulses thereon, a first circuit operatively coupled through switch means to the output of said sensing element for measuring the average of the square of said output signal to emphasize the portion of said output due to large pulse radiation over that due to small pulse radiation regardless of the rates of occurrence of said pulses, and a second circuit operatively coupled through said switch means to the output of said sensing element for measuring the rate of occurrence of said radiation pulses at lower rates of occurrence, said switch means selectively connecting either said first or said second circuit to the output of said linear radiation sensing element.

11. A radiation measuring instrument comprising, a linear radiation sensing element for producing an output signal in response to the impingement of radiation pulses thereon, a first circuit operatively coupled through switch means to the output of said sensing element for measuring the average of the cube of said output signal to emphasize the portion of said output due to large pulse radiation over that due to small pulse radiation regardless of the rates of occurrence of said pulses, and a second circuit operatively coupled through said switch means to the output of said sensing element for measuring the rate of occurrence of said radiation pulses at lower rates of occurrence, said switch means selectively connecting either said first or said second circuit to the output of said linear radiation sensing element.

12. A radiation measuring instrument comprising, a linear radiation sensing element for producing an output signal in response to the impingement of radiation pulses thereon, a first circuit operatively coupled through switch means to the output of said sensing element for measuring the average of at least one non-linear function of said output signal to emphasize the portion of said output due to large pulse radiation over that due to small pulse radiation regardless of the rates of occurrence of said pulses, a second circuit operatively coupled through said switch means to the output of said sensing element for measuring the rate of occurrence of said radiation pulses at lower rates of occurrence, said switch means selectively connecting either said first or said second circuit to the output of said linear radiation sensing element, and means coupled to said first circuit for reducing to zero the average of the first power of said output signal.

13. A radiation measuring instrument comprising, a linear radiation sensing element for producing an output signal in response to the impingement of radiation pulses thereon, a first circuit operatively coupled through switch means to the output of said sensing element for measuring the average of the square of said output signal to emphasize the portion of said output due to large pulse radiation over that due to small pulse radiation regardless of the rates of occurrence of said pulses, a second circuit operatively coupled through said switch means to the output of said sensing element for measuring the rate of occurrence of said radiation pulses at lower rates of occurrence, said switch means selectively connecting either said first or said second circuit to the output of said linear radiation sensing element, and means coupled to said first circuit for reducing to zero the average of the first power of said output signal.

14. A radiation measuring instrument comprising, a linear radiation sensing element for producing an output signal in response to the impingement of radiation pulses thereon, a first circuit operatively coupled through switch means to the output of said sensing element for measuring the average of the cube of said output signal to emphasize the portion of said output due to large pulse radiation over that due to small pulse radiation regardless of the rates of occurrence of said pulses, a second circuit operatively coupled through said switch means to the output of said sensing element for measuring the rate of occurrence of said radiation pulses at lower rates of occurrence, said switch means selectively connecting either said first or said second circuit to the output of said linear radiation sensing element, and means coupled to said first circuit for reducing to zero the average of the first power of said output signal.

15. A radiation measuring instrument for distinguishing between different types of radiation by emphasizing one over the other comprising, a linear radiation sensing element responsive to different types of radiation for producing an electrical output in response to radiation, circuit means for distinguishing and emphasizing that portion of said electrical output due to one type of radiation including thermocouple means coupled to the output of said sensing element for measuring the average of the square of said electrical output to emphasize that portion of said output due to one type of radiation regardless of the rate of occurrence of the output producing events, and means connected between said thermocouple means and sensing element for reducing to zero the average of the first power of said electrical output.

16. A radiation measuring instrument comprising, a linear radiating sensing element for producing an output signal in response to the impingement of radiation pulses thereon, thermocouple means coupled through switch means to the output of said sensing element for measuring the average of the square of said output signal to emphasize the portion of said output due to large pulse radiation over that due to small pulse radiation regardless of the rates of occurrence of said pulses, discriminator and counting means operatively coupled through said switch means to the output of said sensing element for measuring the rate of occurrence of said radiation pulses at lower rates of occurrence, said switch means selectively connecting either said thermocouple means or said discriminator and counting means to the output of said sensing element, and capacitor means coupled to said thermocouple means for reducing to zero the average of the first power of said output signal.

17. A radiation measuring instrument for distinguishing between different types of radiation by emphasizing one over the other comprising, a linear radiation sensing element responsive to different types of radiation for producing an electrical output upon impingement of radiation, circuit means for distinguishing and emphasizing that portion of said electrical output due to one type of radiation including an averaging circuit for measuring the average of the cube of said electrical output, and capacitor means coupled between said circuit and said sensing element for reducing to zero the average of the first power of said output signal.

18. A radiation measuring instrument comprising a linear radiation sensing element for producing an output signal in response to the impingement of radiation pulses thereon, a circuit operatively coupled through switch means to the output of said sensing element for measuring the average of the cube of said output signal to emphasize the portion of said output due to large pulse radiation over that due to small pulse radiation regardless of the rates of occurrence of said pulses, discriminator and counting means operatively coupled through said switch means to the output of said sensing element for measuring the rate of occurrence of said radiation pulses at lower rates of occurrence, said switch means selectively connecting either said circuit or said discriminator and counting means to the output of said sensing element, and capacitor means coupled to said circuit for reducing to zero the average of the first power of said output signal.

References Cited in the file of this patent

UNITED STATES PATENTS

| | | |
|---|---|---|
| 2,640,936 | Pajes | June 2, 1953 |
| 2,662,188 | Crumrine et al. | Dec. 8, 1953 |
| 2,683,813 | Friedman | July 13, 1954 |
| 2,709,754 | Davidon | May 31, 1955 |
| 2,769,098 | Dunham | Oct. 30, 1956 |